US010528246B2

(12) United States Patent
Chiu

(10) Patent No.: US 10,528,246 B2
(45) Date of Patent: Jan. 7, 2020

(54) METHOD AND DEVICE FOR MANAGING INFORMATION

(71) Applicant: HTC Corporation, Taoyuan County (TW)

(72) Inventor: Kai-Feng Chiu, Taoyuan County (TW)

(73) Assignee: HTC Corporation, Taoyuan (TW)

(*) Notice: Subject to any disclaimer, the term of this patent is extended or adjusted under 35 U.S.C. 154(b) by 442 days.

(21) Appl. No.: 14/250,380

(22) Filed: Apr. 10, 2014

(65) Prior Publication Data

US 2015/0293660 A1 Oct. 15, 2015

(51) Int. Cl.
G06F 3/0482 (2013.01)
G06F 3/0488 (2013.01)
G06F 17/24 (2006.01)

(52) U.S. Cl.
CPC .......... *G06F 3/0488* (2013.01); *G06F 3/0482* (2013.01); *G06F 17/243* (2013.01)

(58) Field of Classification Search
CPC ..... G06F 3/0288; G06F 3/0482; G06F 17/243
See application file for complete search history.

(56) References Cited

U.S. PATENT DOCUMENTS

| 2007/0198561 | A1* | 8/2007 | Lee ........................ G06F 3/0483 |
| 2008/0171535 | A1* | 7/2008 | Carmody .......... H04M 1/72552 455/412.2 |
| 2009/0209243 | A1 | 8/2009 | Brown |
| 2010/0039399 | A1* | 2/2010 | Kim ...................... G06F 3/0482 345/173 |
| 2010/0041442 | A1* | 2/2010 | Hong ................... G06F 3/04817 455/566 |
| 2011/0289427 | A1* | 11/2011 | Toprani ................. G06F 3/0488 715/746 |
| 2012/0054167 | A1* | 3/2012 | Chi ..................... G06F 17/30867 707/706 |
| 2013/0203468 | A1* | 8/2013 | Weng .............. H04M 1/274533 455/564 |

(Continued)

FOREIGN PATENT DOCUMENTS

| CN | 101017498 A | 8/2007 |
| CN | 102298503 A | 12/2011 |

(Continued)

OTHER PUBLICATIONS

Office action dated Aug. 21, 2017 for CN application No. 201410443325.7, p. 1-10.

*Primary Examiner* — William L Bashore
*Assistant Examiner* — Gregory A Distefano
(74) *Attorney, Agent, or Firm* — Winston Hsu

(57) ABSTRACT

The disclosure provides a device and a method for managing information displayed on a touch screen display. The method comprises: displaying a list including a plurality of items on the first interface on the touch screen display; detecting a first touch applied to a first area of a first item of the plurality of items displayed on the touch screen display; entering into an item-information-hold state based on the first touch, which comprises: inserting item information of the first item into a second interface; and overlapping the second interface onto the first interface; detecting a second touch applied to the touch screen display during a period of the item-information-hold state; and operating the first interface based on the second touch.

18 Claims, 13 Drawing Sheets

(56) References Cited

U.S. PATENT DOCUMENTS

| | | | | |
|---|---|---|---|---|
| 2013/0222296 A1* | 8/2013 | Paek | ................. | G06F 3/01 345/173 |
| 2014/0153904 A1* | 6/2014 | Adimatyam | ............. | H04N 5/76 386/248 |
| 2014/0229817 A1* | 8/2014 | Afram | .................... | G06F 17/24 715/230 |
| 2014/0344264 A1* | 11/2014 | Kenna | ............... | G06F 17/30973 707/731 |

FOREIGN PATENT DOCUMENTS

| | | | | |
|---|---|---|---|---|
| CN | 103176732 A | | 6/2013 | |
| KR | 102010004150 A | * | 4/2010 | ............ G06F 3/041 |
| TW | 200925556 | | 6/2009 | |

\* cited by examiner

METHOD AND DEVICE FOR MANAGING INFORMATION

BACKGROUND OF THE INVENTION

1. Field of the Invention

The present disclosure relates to the field of intelligent terminals, and more particularly, to a device and a method for managing information.

2. Description of the Prior Art

Today, devices with touch screens, such as smart mobile phones, tablet PCs, etc., are increasingly popular. Taking smart mobile phones as an example, many smart mobile phones have touch screens to be operated by users. Generally, when using a smart mobile phone to view a list, such as a contact list, a short message list, etc., the user always performs a sliding operation to view items included in the list shown on an interface which is displayed on a touch screen display. Generally, when an item is clicked, the touch screen display will be directly switched to another interface showing detailed information of the selected item. That is, the list will not be shown on the touch screen display, but the detailed information of the clicked item will be shown on the touch screen display. Accordingly, it is impossible for the user to hold the show of the information of the selected item on the touch screen display and search for other items in the list by sliding on the same touch screen display, which results in a rather low displaying efficiency of the screen.

SUMMARY OF THE INVENTION

According to an embodiment of the present disclosure, there is provided a method for managing information, including: displaying a list including a plurality of items on the first interface on the touch screen display; detecting a first touch applied to a first area of a first item of the plurality of items displayed on the touch screen display; entering into an item-information-hold state based on the first touch; detecting a second touch applied to the touch screen display during a period of the item-information-hold state; and operating the first interface based on the second touch. The step of entering into an item-information-hold state based on the first touch includes: inserting item information of the first item into a second interface; and overlapping the second interface onto the first interface.

According to an embodiment of the present disclosure, there is provided a device for managing information, including: a touch screen display; a memory configured to store computer-executable instructions; a processor configured to execute the computer-executable instructions to cause the device to execute: displaying a list including a plurality of items in the first interface on the touch screen display; detecting a first touch applied to a first area of a first item of the plurality of items displayed on the touch screen display; entering into an item-information-hold state based on the first touch; detecting a second touch applied to the touch screen display during a period of the item-information-hold state; and operating the first interface based on the second touch. The entering into an item-information-hold state based on the first touch includes: inserting item information of the first item into a second interface; and overlapping the second interface onto the first interface.

According to an embodiment of the present disclosure, there is provided a mobile terminal which includes: a display module configured to display a first interface in a touch screen display, on which a list including a plurality of items is displayed on the first interface; a detecting module configured to detect a first touch applied to a first area of a first item of the plurality of items; a control module configured, based on the first touch, to insert the item information of the first item into a second interface, to control the terminal device to enter into an item-information-hold state, and to control the display module to overlap the second interface on the first interface. During the terminal is in the item-information-hold state, the detecting module is further configured to detect a second touch applied to the touch screen display, and the control module is further configured to operate the first interface based on the second touch.

Alternatively, the second touch is a sliding action applied to the first interface. The detecting module is further configured to detect the sliding action so as to generate a sliding signal corresponding to the first interface, and the control module is further configured, in responses to the sliding signal, to control the display module to display an action of the list corresponding to the sliding signal on the first interface.

Alternatively, the second touch may be a first click action applied to a blank area in the first interface displayed on the touch screen display. The detecting module is further configured to detect a first click action corresponding to a blank area in the first interface so as to generate a first click signal; the control module is further configured, in responses to the first click signal, to cancel the item-information-hold state, and to control the display module to cancel the second interface from the touch screen display at the time when the item-information-hold state is cancelled.

Alternatively, the second touch is a second click action applied to a second area of any one of the plurality of items. The detecting module is further configured to detect a second click action applied to a second area of any one of the plurality of items, so as to generate a second click signal; the control module is further configured, based on the second click signal, to cancel the item-information-hold state, and to control the display module to cancel the second interface from the touch screen display at the time when the item-information-hold state is cancelled and to display detailed information of the selected item on the touch screen display.

Alternatively, the second touch is a touch point dragging action which includes: a touch point on the touch screen display is dragged from the second interface to a second item of the plurality of items is located, or from the second item is located to second interface. The detecting module is further configured to detect a touch point dragging action applied to the touch screen display, so as to generate a touch point dragging signal; the control module is further configured, based on the touch point dragging signal, to merge the item information of the second item and the item information of the first item, set the first item to be invisible so as to link it to the second item, and update the list.

Alternatively, the second touch is a touch point dragging action which includes: a touch point on the touch screen display is dragged from the second interface to a second item of the plurality of items is located, or from the second item is located to the second interface. The detecting module is further configured to detect a touch point dragging action applied to the touch screen display, so as to generate a touch point dragging signal; the control module is further configured, based on the touch point dragging signal, to generate a list including the first item and the second item.

Alternatively, the display module is also configured to display a notice to prompt the user whether or not to perform the merge operation; when the detecting module detects a touch signal indicating that the user's selection is not to perform the merge operation, the display module is further configured to still display both of the first and the second interfaces on the touch screen display.

Alternatively, the second touch may be a third click action applied to the second interface displayed on the touch screen display. The detecting module is further configured to detect a third click action performed the second interface, so as to generate a third click signal; the control module is further configured, based on the third click signal, to control the display module to display a first item on the first interface.

Through the above embodiments, information of the previous selected item can be displayed and in the meantime other items can be searched in the list, which improves the displaying efficiency of the screen display, and simplifies the operation of merging item information.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, embodiments of the disclosure are described in detail. It should be noted that the embodiments described herein are used merely to illustrate, rather than to limit the scope of the present disclosure.

Figure 1:
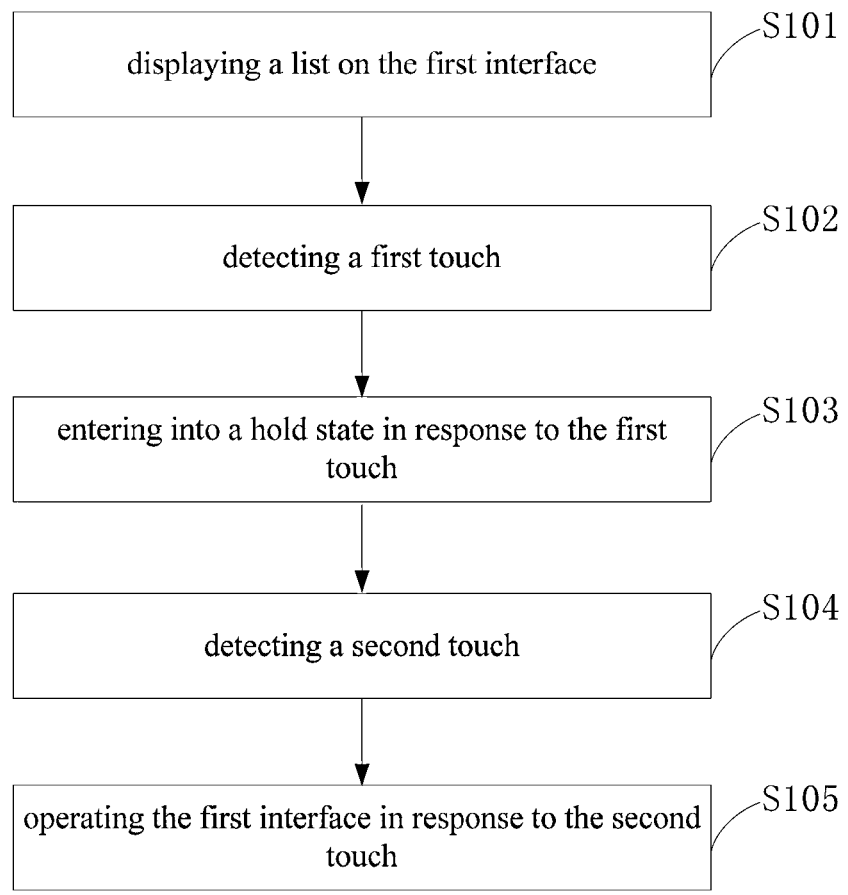
FIG. 1 is a flowchart showing a method for managing information according to an embodiment of the present disclosure.
Figure 2:
FIG. 2 is a schematic view showing a list which is a contact list displayed on a first interface on a touch screen display.

FIG. 1 is a flowchart showing a method 1000 for managing information according to an embodiment of the present disclosure, and FIG. 2 is a schematic view showing a list which is a contact list displayed on a first interface on a touch screen display.

In the present disclosure, a list displayed on the first interface generally may include three areas, i.e. an icon area, a text area and a blank area, as illustrated in FIG. 2. The icon area, the text area and the blank area herein may be referred to as a first area, a second area and a third area, respectively. It should be understood by those skilled in the art that ordinal numbers such as "first", "second" and "third" are merely used to distinguish different components. For example, the text area may be identified as the first area, and the icon area may be identified as the second area. The blank area may be an area on the first interface and neither icons nor texts are displayed on the blank area, e.g., an area between two items or an area on the right side of the text area of each item.

As illustrated in FIG. 1, in step S101, a list, which may include a plurality of items, is displayed on a first interface on a touch screen display. For example, a contact list is displayed on the first interface of the touch screen display of a terminal device, the contact list may include a plurality of contact items, i.e. from a contact Axx to a contact Zxx, as illustrated in FIG. 2.

In step S102, a first touch is detected, wherein the first touch is performed on the first area of a first item of the plurality of items displayed on the touch screen display. For example, the first touch (such as a click signal) performed on an icon area of a contact item Cxx in the contact list is detected.

Figure 3:
FIG. 3 is a schematic view showing an item-information-hold state.

In step S103, the terminal device enters into an item-information-hold state (hereinafter called hold state) based on the first touch, as illustrated in FIG. 3.

For example, step S103 may further include: inserting the item information of the first item into a second interface; and overlapping the second interface onto the first interface, such that the terminal device enters into the hold state. For example, icon information (such as a user's avatars, etc.) and/or abstract information (such as a name, a phone number, an address, a mailbox, etc.) of the contact item Cxx may be inserted into the second interface. Then the second interface is overlapped onto the first interface.

As illustrated in FIG. 3, the second interface is overlapped and displayed at a lower right corner on the first interface. Alternatively, the icon displayed on the second interface may be enlarged; the abstract information may be displayed on a rolling manner; and/or the second interface may have various transparencies. Alternatively, the second interface may be overlapped onto a fixed location on the first interface; or may be floated on the first interface; or may change its display location according to a received instruction. Alternatively, a size of the second interface may be adjustable.

It should be noted that after the icon information (such as the user's avatars, etc.) and/or abstract information of the contact item Cxx is inserted into the second interface, the icon information and/or abstract information of the contact item Cxx may be hold on the first interface or may be removed from the first interface as desired, which are not intended to limit the scope of the disclosure.

In step S104, a second touch applied to the touch screen display is detected during the period of the hold state. For example, the second touch applied to the touch screen display is detected in the period in which the second interface is overlapped onto the first interface. In step S105, the first interface is operated based on the second touch.

Through the above embodiment, when the user selects an item in the list displayed on the first interface, the item information (including, for example, the icon information and/or the abstract information of the item) of the selected item may be displayed on the second interface while the second interface is overlapped onto the first interface, which may improve the displaying efficiency of the screen display.

The above step of operating the first interface based on the second touch includes performing one or more of the following operations: a sliding operation, an operation of cancelling the hold state, an operation of entering into an interface of detailed information, an operation of merging item information, which will be described hereinafter.

Figure 4:
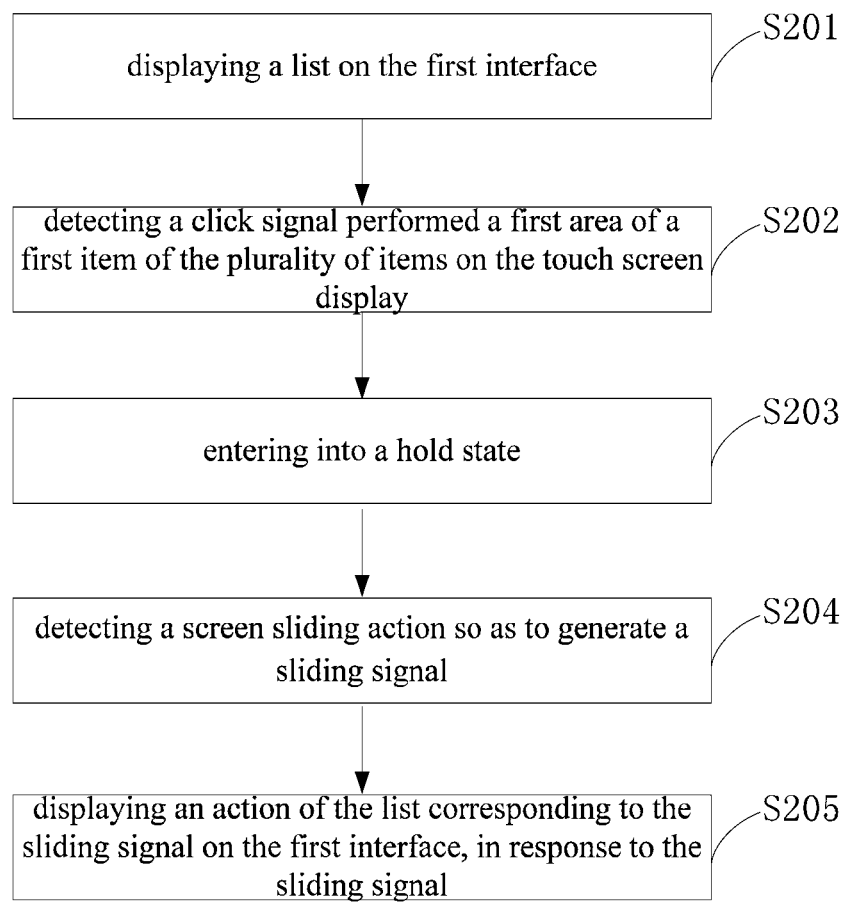
FIG. 4 is a flowchart showing a method for managing information according to an embodiment of the present disclosure.

FIG. 4 is a flowchart showing a method 2000 for managing information according to an embodiment of the present disclosure. Steps S201-S203 of the method are the same as steps S101-S103 described above, respectively, which will not be repeated herein.

Alternatively, the second touch may be a sliding action applied to the first interface. During the period in which the terminal device is in the hold state, the method 2000 may further include the following steps.

Figure 5:
FIG. 5 is a schematic view showing a sliding operation in the item-information-hold state.

In step S204, the sliding action applied to the first interface on the touch screen display (as illustrated in FIG. 5) is detected, so that a sliding signal corresponding to the first interface is generated. In step S205, an action of the list corresponding to the sliding signal is displayed on the first interface, based on the sliding signal.

For example, in step 204, an up-and-down sliding action applied to the first interface on the touch screen display is detected, so that the sliding signal corresponding to the first interface is generated. In step S205, an action of the list corresponding to the sliding signal in the first interface is displayed based on the sliding signal, for example, the list is rolled upward or downward. In the meantime, the second interface is still overlapped onto the first interface, and displays the icon information and/or abstract information of the previously selected item (e.g., the contact item Cxx).

Through this embodiment, the information of the previously selected item may be still displayed while an item is searched for in the list. For example, based on the first touch applied to the first area (e.g., the icon area) of the contact item Cxx in the contact list, the terminal device enters into the hold state. For example, the second interface is overlapped onto the first interface and displays the icon information and/or abstract information of the selected contact item Cxx. In the hold state, based on the second touch (i.e., the sliding action applied to the first interface) performed on the touch screen display, the contact list may be displayed as being rolled upward/downward on the first interface, while the icon information and/or abstract information of the selected contact item Cxx is still displayed on the second interface. In this way, a second interface may display the information of a previously selected item, while the user is allowed to perform the sliding operation to search for other items.

Figure 6:
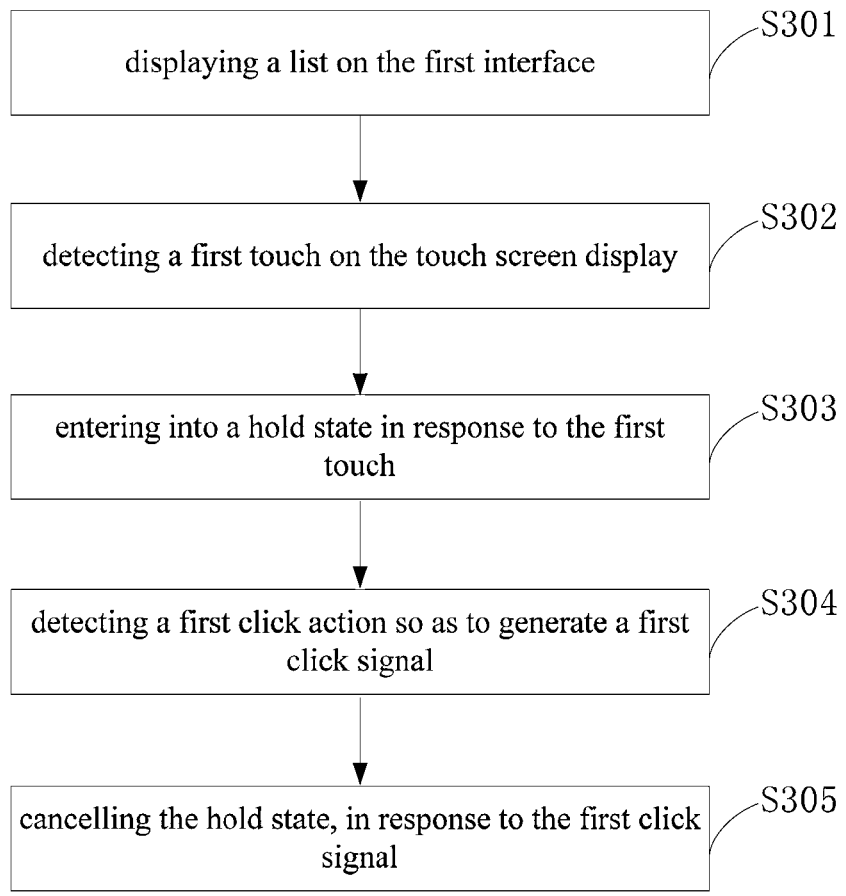
FIG. 6 is a flowchart showing a method for managing information according to an embodiment of the present disclosure.

FIG. 6 is a flowchart showing a method 3000 for managing information 3000 according to an embodiment of the present disclosure. Steps S301-S303 of this method are the same as steps S101-S103 described above, respectively, which will not be repeated herein.

Alternatively, the second touch may be a first click action applied to a blank area on the first interface displayed on the touch screen display. During the period in which the terminal device is in the hold state, the method 3000 may further include the following steps.

In step S304, the first click action applied to the blank area in the first interface on the touch screen display is detected, so that a first click signal is generated. In step S305, the hold state is cancelled based on the first click signal. Step S305 may also include: releasing the item information of the first item from the second interface; and cancelling the second interface.

For example, in step S304, the first click action applied to the blank area between Cxx and Dxx in the contact list is detected, so that the first click signal is generated. In step S305, based on the first click signal, the icon information and/or abstract information of the previously selected contact item Cxx is released from the second interface; and the second interface from the touch screen display is cancelled.

Figure 7:
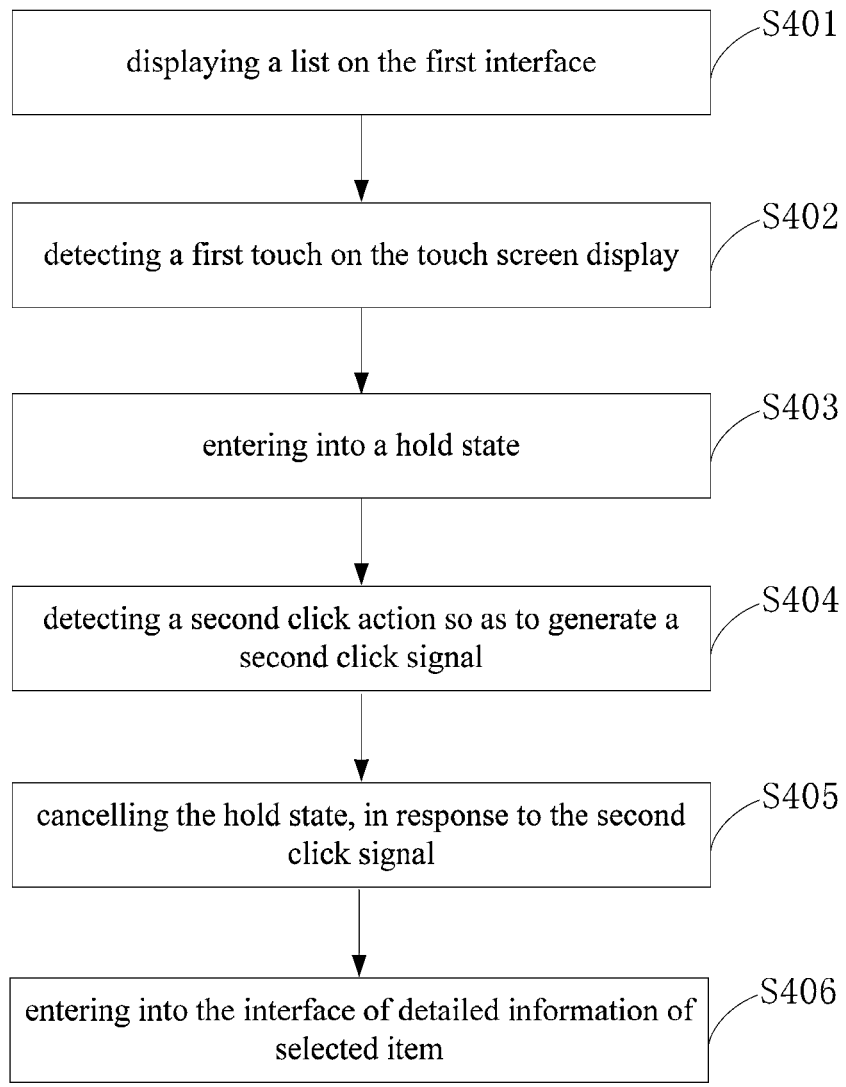
FIG. 7 is a flowchart showing a method for managing information according to an embodiment of the present disclosure.

FIG. 7 is a flowchart showing a method 4000 for managing information according to an embodiment of the present disclosure. Steps S401-S403 of this method are the same as steps S101-S103 described above, respectively, which will not be repeated herein.

Alternatively, the second touch may be a second click action applied to a second area of any one of the plurality of items. During the period in which the terminal device is in the hold state, the method 4000 may further include the following steps.

In step S404, the second click action applied to the second area of any one of the plurality of items is detected, so that a second click signal is generated. In step S405, based on the second click signal, the hold state is cancelled. In step S406, detailed information of the selected item in the first interface.

Figure 8:
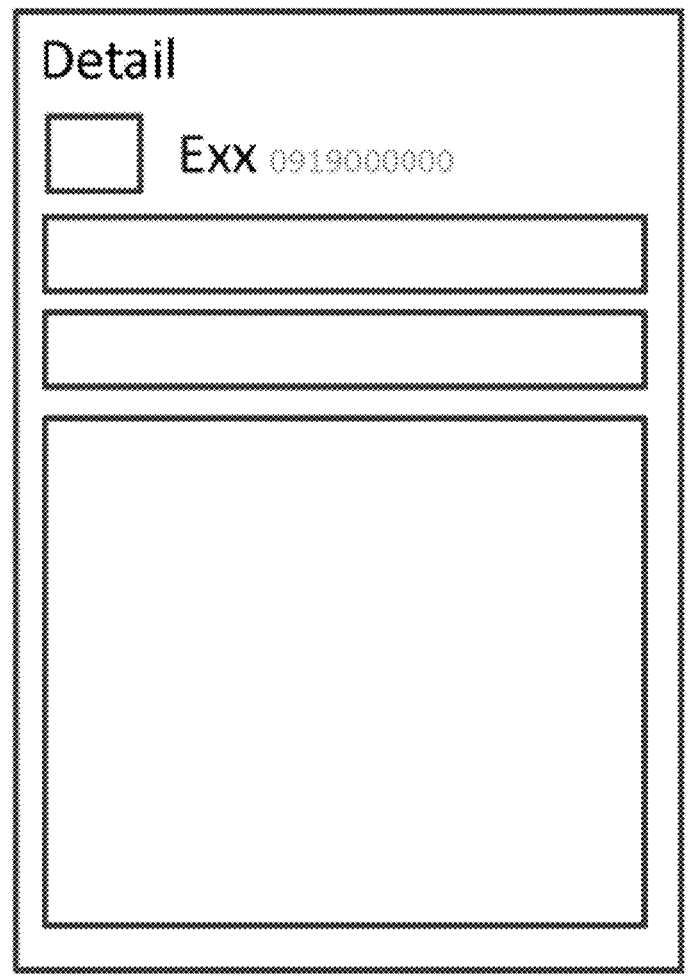
FIG. 8 is a schematic view showing an interface for detailed information of a contact item.

For example, in step S404, the second click action applied to a text area of a contact item Exx in the contact list is detected, so that a second click signal is generated. In step S405, based on the second click signal, the icon information and/or abstract information of the previously selected contact item Cxx is released from the second interface; and the second interface is cancelled from the touch screen display. In step S406, the detailed information of the contact item Exx is displayed on the touch screen display, for example, the showing on the touch screen display is transformed from the first interface to an interface of the detailed information of the contact item Exx, as illustrated in FIG. 8.

Figure 9:
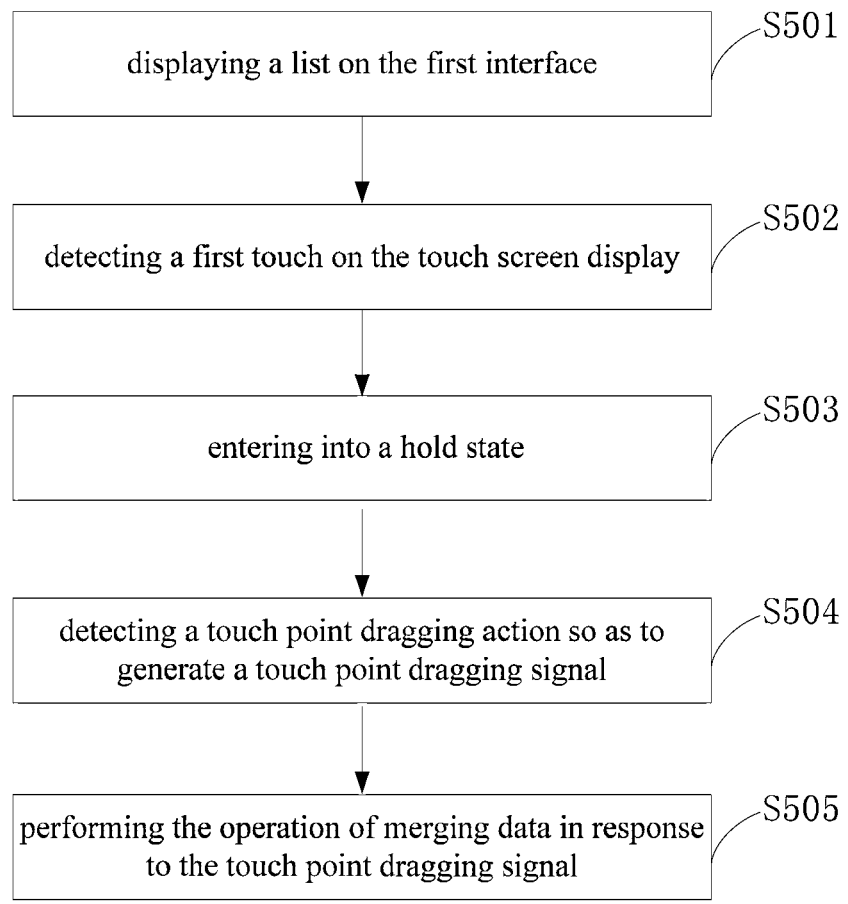
FIG. 9 is a flowchart showing a method for managing information according to an embodiment of the present disclosure.

FIG. 9 is a flowchart showing a method 5000 for managing information according to an embodiment of the present disclosure. Steps S501-S503 of this method are the same as steps S101-S103 described above, respectively, which will not be repeated herein.

Alternatively, the second touch may be a touch point dragging action, for example, a touch point on the touch screen display is dragged from the second interface to a second item of the plurality of items is located, or is dragged from the second item is located to the second interface. When the terminal device is in the hold state, the method 5000 may further include the following steps.

In step S504, the touch point dragging action is detected, so that a touch point dragging signal is generated. In step S505, based on the touch point dragging signal, an operation of merging item information is performed. The step S505 may also include: merging the item information of the second item and the item information of the first item; setting the first item to be invisible, so as to link the first item to the second item; and updating the list.

Figure 10:
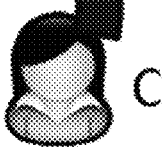
FIG. 10 is a schematic view showing that a touch point is dragged to a contact item from a second interface.

For example, in step S504, the touch point dragging action, so that the touch point dragging signal is generated, for example, the touch point is dragged from the second interface to the contact item Fxx in the contact list is located. For example, it may be shown on the touch screen display that the second interface is dragged to the contact item Fxx is located, as illustrated in FIG. 10; or in step S504, the touch point dragging action that the touch point performed on the contact item Fxx is dragged from the contact item Fxx is located to the second interface, for example, it may be shown on the touch screen display that the contact item Fxx is dragged to the second interface is located, so that the touch point dragging signal is generated.

In step S505, based on the touch point dragging signal, the item information of the contact item Fxx and that of the contact item Cxx are merged, the contact item Cxx is set to be invisible and is linked the contact item Fxx, and the list is updated. That is, the item Cxx is not displayed on the list, and programs associated with the item Cxx are linked to the contact item Fxx. For example, if a call from Cxx is received, it will be displayed that a call from Fxx is received. For another example, a short message to Cxx will be displayed as a message to Fxx.

For example, in step S501, a calendar may be displayed on the first interface. In step S502, the first touch at a first area of the first date is detected. In step S503, the terminal device enters into the hold state based on the first touch. In step S504, the touch point dragging action is detected, so that the touch point dragging signal is detected. That is, it is detected that the touch point is dragged from the second interface to a second date in the calendar list is located so as to generate the touch point dragging signal, and vice versa. In step S505, based on the touch point dragging signal, the item information (e.g., meetings, birthdays and notices, etc.) associated with the first date is merged into the item information of the second item, the item information of the first date is set to be invisible and linked to the second item. In this way, all of item information associated with the first date will be represented on the second date rather than on the first date.

Through this embodiment, information of respective items in the list may be easily merged.

Alternatively, the step S505 may also include: generating a list including the first item and the second item when the touch point dragging signal is generated. For example, when it is detected that the touch point is dragged from the second interface to the contact item Fxx in the contact item is located, the touch point dragging signal is generated and the list including the first item and the second item is generated, and vice versa. For example, in step S505, a contact group including the contact item Cxx and the contact item Fxx is generated when the touch point dragging signal is generated.

For example, in step 501, a list of audio/video files may be displayed on the first interface. In this case, in step 502, the first touch in the icon area of a first audio/video document. In step 503, based on the first touch, the terminal device enters the hold state. In step 504, the touch point dragging action is detected, so as to generate a touch point dragging signal, i.e., to detect that the touch point is dragged from the second interface to the second audio/video file in the list is located, so that the touch point dragging signal is generated, and vice versa. In step 505, based on the touch point dragging signal, a play list including the first and the second audio/video files is generated.

For another example, in step 501, a short message list may be displayed on the first interface. In this case, in step 502, the first touch in the first area of a first short message. In step 503, the terminal device enters into the hold state based on the first touch. In step 504, the touch point dragging action is detected, so that the touch point dragging signal is generated, i.e., to detect that the touch point is dragged from the second interface to a second short message in the short message list is located so that the touch point dragging signal is generated, and vice versa. In step 505, based on the touch point dragging signal, a short message group including the first and the second short messages is generated.

For yet another example, in step 501, an Email list may be displayed on the first interface. In this case, in step 502, the first touch in the first area of a first Email is detected. In step 503, based on the first touch, the terminal device enters into the hold state. In step 504, the touch point dragging action is detected, so that the touch point dragging signal is generated, i.e., to detect that the touch point is dragged from the location the second interface to a second Email in the Email list is located so that the touch point dragging signal is generated, and vice versa. In step 505, based on the touch point dragging signal, an Email group including the first and the second Emails is generated.

For yet another example, in step 501, a document (e.g., a word, an excel, etc.) list may be displayed on the first interface. In this case, in step 502, the first touch in the first area of a first document. In step 503, based on the first touch, the terminal device enters into the hold state. In step 504, the touch point dragging action is detected, so that the touch point dragging signal is generated, i.e., to detect that the touch point is dragged from the second interface to a second document in the document list is located so that the touch point dragging signal is generated, and vice versa. In step 505, based on the touch point dragging signal, a document folder including the first and the second documents is generated.

Figure 11:
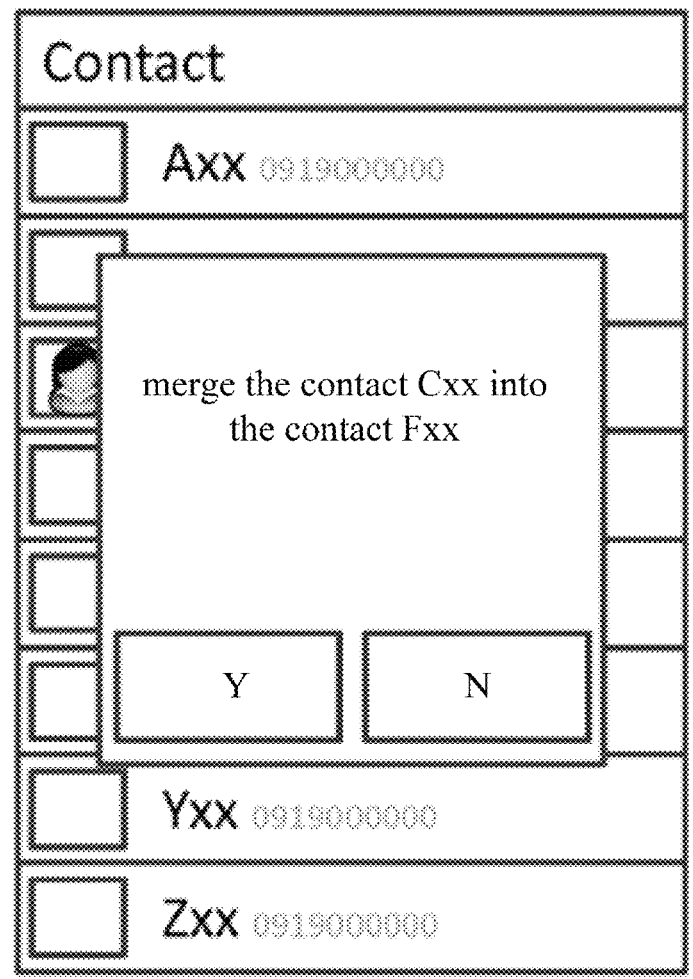
FIG. 11 is a schematic view showing that a notice is displayed before a merging of item information.

Alternatively, a notice may also be sent out before item information is merged in step S505 to prompt the user whether or not to perform the merge operation, as illustrated in FIG. 11. If it is detected that the user's selection is not to perform the merge operation, the terminal device returns to the previous hold state.

Figure 12:
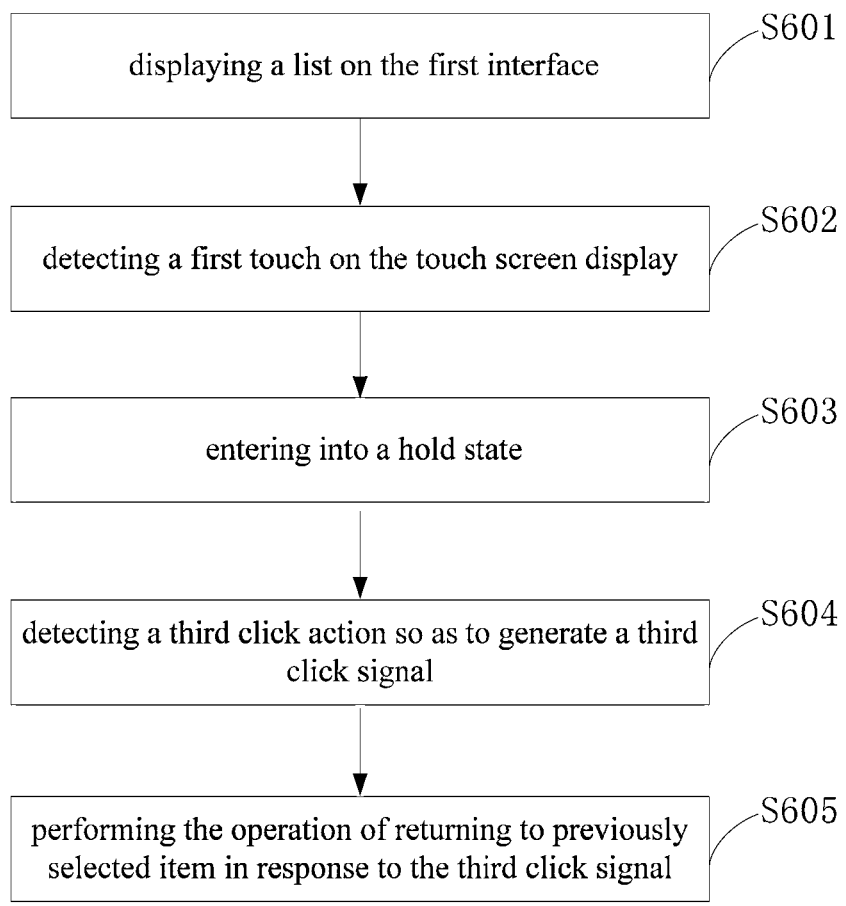
FIG. 12 is a flowchart showing a method for managing information according to an embodiment of the present disclosure.

FIG. 12 is a flowchart showing a method 6000 for managing information according to an embodiment of the present disclosure. Steps S601-S603 of this method are the same as steps S101-S103 described above, respectively, which will not be repeated herein.

Alternatively, the second touch may be a third click action applied to the second interface displayed on the touch screen display. During the period in which the terminal device enters into the hold state, the method 6000 may further include the following steps.

In step 604, the third click action applied to the second interface on the touch screen display is detected, so as to generate a third click signal. In step 605, the first interface displays the first item based on the third click signal.

For example, in step 601, the contact list is displayed on the first interface. In step 602, the first touch (e.g., a click signal) performed on the icon area of the contact item Cxx in the contact list is detected. In step 603, the terminal device enters into the hold state based on the first touch. For example, the icon information (such as a user's avatars, etc.) and/or the abstract information (such as a name, a phone number, an address, a mailbox, etc.) of the contact item Cxx is inserted into the second interface, and the second interface is overlapped onto the first interface.

In the hold state, items displayed on the second interface may not be displayed on the first interface. For example, in the hold state, other operations may be performed, such as a sliding operation which causes the contact list to be rolled upward and downward, and thus the contact item Cxx will not be displayed on the first interface. In step 604, a third click action applied to the second interface is detected so as to generate a third click signal. In step 605, based on the third click signal, the first item is displayed on the first interface. For example, when the contact item Cxx is not displayed on the first interface, the third click performed on the second interface is detected so as to generate the third click signal; the contact list displayed on the first interface will be rolled to display the contact item Cxx on the first interface based on the third click signal, for example the terminal devices returns to the state illustrated in FIG. 3. It should be understood by those skilled in the art that the above operation may be performed even when the contact item Cxx is still displayed on the first interface.

Alternatively, the above step S605 may include that the first item is displayed on the first interface based on the third click signal; and the hold state is cancelled. For example, in step S604, the third click performed on the second interface is detected so as to generate the third click signal. In step 605, the contact list displayed on the first interface will be rolled to display the contact item Cxx on the first interface (for example the terminal device returns to the state illustrated in FIG. 3) based on the third click signal, and the icon and/or abstract information of the previously selected contact item Cxx is released from the second interface, and the second interface is cancelled from the touch screen display.

It should be understood by those skilled in the art that the above operations of sliding, cancelling the hold state, entering into the interface of detailed information, merging item information and returning to the previously selected item may be combined in various ways. For example, during the period of the hold state, the sliding operation may be performed before the operation of entering into the interface of detailed information; or the sliding operation may be performed before the operation of merging item information; or, the sliding operation may be performed before the operation of cancelling the hold state, and so on.

Figure 13:
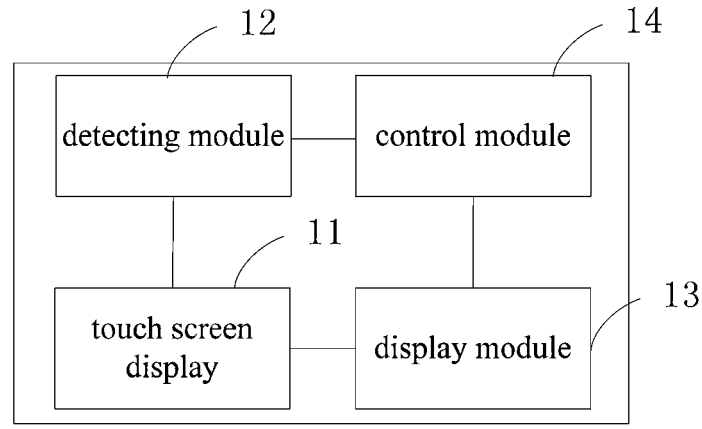
FIG. 13 is a schematic view showing a mobile terminal according to an embodiment of the present disclosure.

FIG. 13 is a schematic view showing a mobile terminal 10 according to an embodiment of the present disclosure. As illustrated in FIG. 13, the terminal device 10 includes a touch screen display 11, a detecting module 12, a display module 13 and a control module 14.

The display module 13 is configured to display a first interface on the touch screen display 11, on which a list including a plurality of items is displayed on the first interface. The detecting module 12 is configured to detect a first touch applied to the first area of a first item of the plurality of items displayed on the touch screen display. When the detecting module 12 detects a first click signal, the control module 14 is configured, based on the first touch, to insert the item information of the first item into a second interface, to make the terminal device 10 enter into the item information hold state, and to control the display module 13 to overlap the second interface onto the first interface. When the terminal is in the hold state, the detecting module 12 is configured to detect a second touch applied to the touch screen display; and the control module 14 is further configured to operate the first interface based on the second touch.

For example, the display module 13 displays the first interface on the touch screen display 11, and a list including a plurality of items is displayed on the first interface, i.e. from a contact Axx to a contact Zxx, as illustrated in FIG. 2. When the detecting module 12 detects the first touch applied to the icon area of the contact item Cxx, the control module 14 responds to the first touch to insert icon information (such as a portrait, etc.) and/or abstract information (such as a name, a phone number, an address, a mailbox, etc.) of the contact item Cxx into the second interface, make the terminal device 10 enter into the hold state, and control the display module 13 to be overlapped the second interface onto the first interface, as illustrated in FIG. 3.

As illustrated in FIG. 3, the second interface is overlapped onto a lower right corner on the first interface. Alternatively, the icon displayed on the second interface may be enlarged; the abstract information may be displayed on a rolling manner, and/or the second interface may have various transparencies. Alternatively, the second interface may be overlapped onto a fixed location on the first interface; or may be floated on the first interface; or may change its display location according to a received instruction. Alternatively, a size of the second interface may be adjustable.

Through the above embodiment, when the user selects an item in the list displayed on the first interface, the item information of the selected item may be displayed on the second interface, while the second interface is displayed onto the first interface, which improves the displaying efficiency of the screen.

During the period of the hold state, the control module 14 operates the first interface based on the second touch, which includes that the control module 14 performs one or more of the following operations: a sliding operation, an operation of cancelling the hold state, an operation of entering into an interface of detailed information, an operation of merging item information, which will be described hereinafter.

Alternatively, the second touch may be a sliding action applied to the first interface. During the period in which the terminal is in the hold state, the detecting module 12 is configured to detect the sliding action applied to the first interface on the touch screen display 11, so as to generate a sliding signal corresponding to the first interface. When the detecting module 12 detects the sliding signal, the control module 14 controls the display module 13 to display an action of the list corresponding to the sliding signal on the first interface in responses to the sliding signal.

For example, during the period of the hold state, the detecting module 12 detects an up-and-down sliding action applied to the first interface on the touch screen display 11, so as to generate the sliding signal corresponding to the first interface. When the detecting module 12 detects the sliding signal, the control module 14 respond to the sliding signal to control the display module 13 to display an action of the list corresponding to the sliding signal on the first interface, for example the list is rolled upward or downward. In the meantime, the display module 13 makes the second interface be still overlapped onto the first interface and displays the icon information and/or abstract information of the previously selected item (e.g., the contact item Cxx).

Through this embodiment, the second interface may display the information of the previously selected item, and in this case, the user is allowed to perform the sliding operation to search for another item.

Alternatively, the second touch may be a first click action applied to a blank area on the first interface displayed on the touch screen display. During the period in which the mobile terminal 10 is in the hold state, the detecting module 12 is further configured to detect the first click action applied to the blank area on the first interface so as to generate a first click signal. When the detecting module 12 generates the first click signal, the control module 14 releases the item information of the first item from the second interface to cancel the hold state of the mobile terminal 10 and controls the display module 13 to cancel the second interface from the touch screen display, in responses to the first click signal.

For example, during the period in which the mobile terminal 10 is in the hold state, the detecting module 12 detects the first click action applied to the blank area between Cxx and Dxx of the contact list, so as to generate the first click signal. When the detecting module 12 generates the first click signal, the control module 14 releases the icon information and/or abstract information of the previously selected contact item Cxx from the second interface and controls the display module 13 to cancel the second interface from the touch screen display, in responses to the first click signal.

Alternatively, the second touch is a second click action applied to a second area of any one of the plurality of items. During the period of the hold state, the detecting module 12 is configured to detect the second click action applied to the second area of any one of the plurality of items, so as to generate a second click signal. When the detecting module 12 generates the second click signal, the control module 14 further releases the item information of the first item from the second interface to cancel the hold state of the mobile terminal 10 and controls the display module 13 to cancel the second interface from the touch screen display 11 and to display detailed information of the selected item on the first interface, in responses to the second click signal.

For example, during the period of the hold state, the detecting module 12 detects the second click action applied to the text area of the contact item Exx, so as to generate the second click signal. When the detecting module 12 generates the second click signal, the control module 14 responds to the second click signal to release the icon information and/or abstract information of the previously selected contact item Cxx from the second interface and control the display module 13 to cancel the second interface from the touch screen display 11 and to display the detailed information of the contact item Exx on the touch screen display 11, for example, the touch screen display enters into an interface of the detailed information of the contact item Exx from the first interface, as illustrated in FIG. 8.

Alternatively, the second touch may be a touch point dragging action which includes: a touch point performed on the touch screen display is dragged from the second interface to the second item of the plurality of items, or from the second item is located to the second interface. During the period of the hold state, the detecting module 12 is configured to detect the touch point dragging action applied to the touch screen display 11, so as to generate a touch point dragging signal. When the detecting module 12 generates the touch point dragging signal, the control module 14 merges the item information of the second item and the item information of the first item, sets the first item to be invisible and links it to the second item, and updates the list, in responses to the touch point dragging signal.

For example, during the period of the hold state, the detecting module 12 generates the touch point dragging signal. For example, the detecting module 12 detects that the touch point is dragged from the second interface the contact item Fxx in the contact list is located. It may be shown on the touch screen display that the second interface is dragged to the contact item Fxx is located, as illustrated in FIG. 10; or the detecting module 12 detects that the touch point is dragged from the contact item Fxx is located to the second interface, for example, it may be shown on the touch screen display that the contact item Fxx is dragged to the second interface.

When the detecting module 12 generates the touch point dragging signal, the control module 14 merges the item information of the contact item Fxx and that of the contact item Cxx, sets the contact item Cxx to be invisible and links it to the contact item Fxx, and updates the list, in responses to the touch point dragging signal. That is, the item Cxx is not displayed in the list, and programs associated with the item Cxx is linked to the contact item Fxx. For example, if a phone call from Cxx is received, it will be displayed that a call from Fxx is received. For another example, a short message to Cxx will be displayed as a short message to Fxx.

For another example, before the mobile terminal 10 enters into the hold state, a calendar may be displayed on the first interface on the touch screen display 11. The detecting module 12 detects a first touch at a first area of a first date. When the detecting module 12 detects the first touch, the control module 14 makes the mobile terminal 10 enter into the hold state, in responses to the first touch. During the period of the hold state, the detecting module 12 detects the touch point dragging action, so as to generate the touch point dragging signal. That is, the detecting module 12 detects that the touch point is dragged from the location of the second interface to a second date in the calendar list is located, so as to generate the touch point dragging signal, and vice versa. When the detecting module 12 detects the touch point dragging action to generate the touch point dragging signal, the control module 14 merges the item information (e.g. meetings, birthdays and notices, etc.) of the first date into the item information of the second item, sets the item information of the first date to be invisible and links the item information of the first date to the second date, in responses to the touch point dragging signal. In this way, all of item information associated with the first date will be represented on the second date rather than on the first date.

Through this embodiment, item information of respective items in the list may be easily merged.

Alternatively, when the detecting module 12 detects the touch point dragging action so as to generate the touch point dragging signal during the period of the hold state, the control module 14 generates a list including the first item and the second item, in responses to the touch point dragging signal.

For example, the detecting module 12 detects the touch point dragging action so as to generate the touch point dragging signal during the period of the hold state, i.e., the detecting module 12 detects that the touch point is dragged from the location of the second interface to the contact item Fxx in the contact item is located, so as to generate the touch point dragging signal, and vice versa. When the detecting module 12 detects the touch point dragging action so as to generate the touch point dragging signal, the control module 14 is configured to generate a contact group including the contact item Cxx and the contact item Fxx, based on the touch point dragging signal.

For example, before the mobile terminal 10 enters the hold state, a list of audio/video files may be displayed on the first interface on the touch screen display 11. The detecting module 12 detects the first touch at the first area of the first audio/video file. When the detecting module 12 detects the first touch, the control module 14 makes the mobile terminal 10 enter the hold state. During the period of the hold state, the detecting module 12 detects the touch point dragging action, so as to generate the touch point dragging signal. That is, the detecting module 12 detects that the touch point is dragged from the second interface to the second audio/video file in the list of audio/video files is located so as to generate the touch point dragging signal, and vice versa. When the detecting module 12 detects the touch point dragging action so as to generate the touch point dragging signal, the control module 14 generates a play list including the first and the second audio/video files, in responses to the touch point dragging signal.

For another example, before the mobile terminal 10 enters into the hold state, a short message list is also displayed on the first interface on the touch screen display 11. The detecting module 12 detects the first touch at the first area of a first short message. When the detecting module 12 detects the first touch, the control module 14 makes the mobile terminal 10 enter into the hold state. During the period of the hold state, the detecting module 12 detects the touch point dragging action, so as to generate the touch point dragging signal. That is, the detecting module 12 detects that the touch point is dragged from the second interface to a second short message in the short message list is located so as to generate the touch point dragging signal, and vice versa. When the detecting module 12 detects the touch point dragging action so as to generate the touch point dragging signal, the control module 14 generates a short message group including the first and the second short messages, in responses to the touch point dragging signal.

For yet another example, before the mobile terminal 10 enters into the hold state, an Email list may be displayed on the first interface on the touch screen display 11. The detecting module 12 detects the first touch at the first area of a first Email. When the detecting module 12 detects the first touch, the control module 14 makes the mobile terminal 10 enter into the hold state. During the period of the hold state, the detecting module 12 detects the touch point dragging action, so as to generate the touch point dragging signal. That is, the detecting module 12 detects that the touch point is dragged from the second interface to a second Email in the Email list is located so as to generate the touch point dragging signal, and vice versa. When the detecting module 12 detects the touch point dragging action so as to generate the touch point dragging signal, the control module 14 generates an Email group including the first and the second Emails, in responses to the touch point dragging signal.

For yet another example, before the mobile terminal 10 enters into the hold state, a document (e.g., word, excel, etc.) list may be displayed on the first interface on the touch screen display 11. The detecting module 12 detects the first touch at a first area of the first document. When the detecting module 12 detects the first touch, the control module 14 makes the mobile terminal 10 enter into the hold state. During the period in which the mobile terminal 10 is in the hold state, the detecting module 12 detects the touch point dragging action, so as to generate the touch point dragging signal. That is, the detecting module 12 detects that the touch point is dragged from the second interface to a second document in the document list is located so as to generate the touch point dragging signal, and vice versa. When the detecting module 12 detects the touch point dragging action so as to generate the touch point dragging signal, the control module 14 generates a document folder including the first and the second files, in responses to the touch point dragging signal.

Alternatively, the display module 13 is configured, before the control module 14 performs the operation of merging item information, to display a notice to prompt the user whether or not to perform the merge operation. When the detecting module 12 detects a touch signal indicating that the merge operation is not performed, the control module 14 controls the mobile terminal 10 to return to the previous hold state. That is, the display module 13 still displays both of the first and the second interfaces on the touch screen display 11.

Alternatively, the second touch may be a third click action applied to the second interface displayed on the touch screen display. The detecting module 12 is configured, during the period of the hold state, to detect the third click action applied to the second interface on the touch screen display, so as to generate a third click signal. The control module 14 is configured to display a first item on the first interface in responses to the third click signal.

For example, the detecting module 12 detects the first touch (e.g., a click signal) performed on the icon area of the contact item Cxx in the contact list. The control module 14 inserts the icon information (such as a portrait, etc.) and/or the abstract information (such as a name, a phone number, an address, a mailbox, etc.) of the contact item Cxx into the second interface and controls the display module 13 to overlap the second interface onto the first interface, in responses to the first touch.

In the hold state, items displayed on the second interface may not be displayed on the first interface. For example, in the hold state, other operations have been performed, such as the sliding operation which makes the contact list to be rolled upward and downward, and thus the contact item Cxx is not displayed on the first interface. In the hold state, the detecting module 12 detects the third click action applied to the second interface so as to generate the third click signal. The control module 14 controls the display module 13 to display the first item on the first interface, in responses to the third click signal. For example, when the contact item Cxx is not displayed on the first interface, the detecting module 12 detects the third click performed on the second interface so as to generate the third click signal. The control module 14 respond to the third click signal to control the display module 13 to make the contact list displayed on the first interface be rolled, so as to display the contact item Cxx ion the first interface, for example to return to the state illustrated in FIG. 3. It should be understood by those skilled in the art that, the above operation may be performed even when the contact item Cxx is displayed on the first interface.

Alternatively, the control module 14 is configured, in responses to the third click signal, to control the display module 13 to display the first item on the first interface and to cancel the second interface. For example, the detecting module 12 detects the third click performed on the second interface so as to generate the third click signal. The control module 14 controls the display module 13 to make the contact list displayed on the first interface be rolled in responses to the third click signal, so as to display the contact item Cxx on the first interface (for example, to return to the state illustrated in FIG. 3), and controls the display module 13 to release the icon and/or abstract information of the previously selected contact item Cxx from the second interface and to cancel the second interface from the touch screen display.

Figure 14:
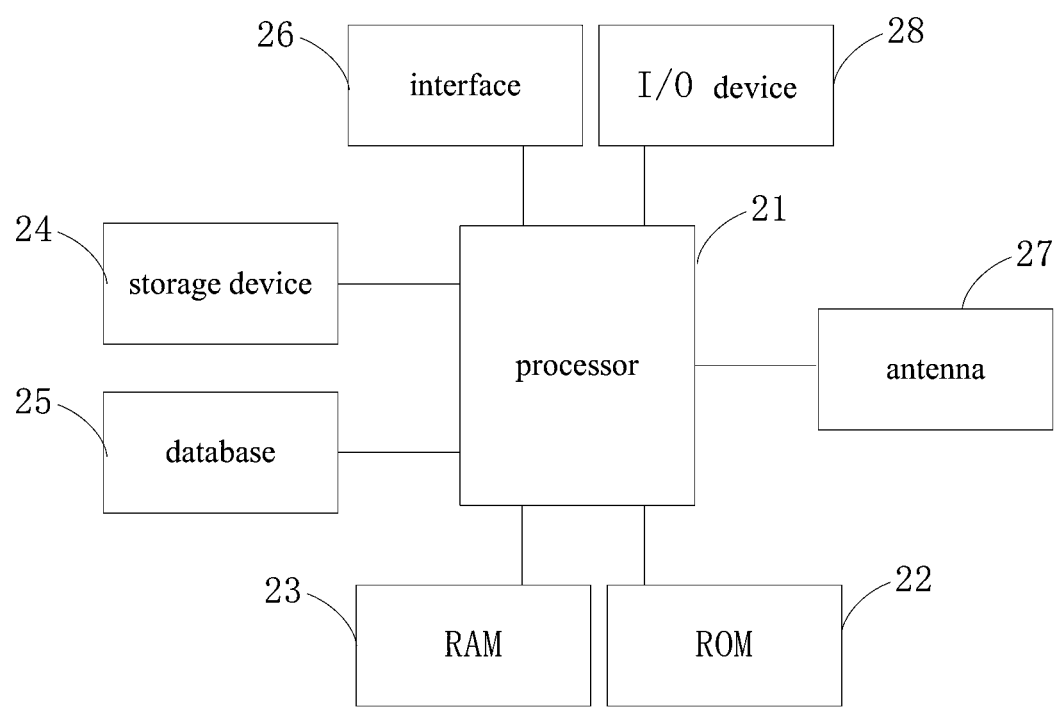
FIG. 14 is a schematic view showing a device for managing information according to an embodiment of the present disclosure.

The present disclosure also relates to a device 20 for managing information. The device for managing information may be a mobile terminal, such as a mobile phone, a PAD, a notebook computer, etc. As illustrated in FIG. 14, the device 20 for managing information includes a processor 21 for executing software instructions corresponding to the steps of the method described above, a memory (e.g., RAM 22, ROM 23) for storing and reading information and the software instructions corresponding to the steps of the method described above, a storage device 24 and a database 25 for storing data, e.g., information of each of the above lists, each item information, each group information, etc., and other data structures, such as various interfaces 26, an antenna 27, an I/O device 28, etc. The I/O device 28 may include a touch screen display. For example, the device 20 for managing information may display a list which may include a plurality of items through the touch screen display. The processor 21 may execute detecting instructions to detect a first touch applied to a first area of a first item in the plurality of items on the touch screen display.

When the above first touch is detected, the processor 21 executes an instruction of a hold state in responses to the first touch, so as to make the device 20 enter into the hold state. For example, the processor 21 inserts the item information of the first item into a second interface, and overlaps the second interface onto the first interface, so that the terminal enters into the hold state.

In the hold state, the processor 21 may execute a detecting instruction to detect a second touch applied to the touch screen display. When the above second touch is detected, the processor 21 operates the first interface in responses to the second touch.

Alternatively, when the above second touch is detected, the processor 21 executes computer executable instructions to execute one or more of operations to operate the first interface, the one or more of operations includes: a sliding operation, an operation of cancelling the hold state, an operation of entering into an interface of detailed information, an operation of merging item information, and an operation for returning to the previously selected item.

Alternatively, the second touch is a sliding action applied to the first interface. After the device 20 enters into the hold state, the processor 21 may execute the detecting instruction to detect the sliding action applied to the first interface so as to generate a sliding signal corresponding to the first interface. When the sliding signal is generated upon the sliding action is detected, the processor 21 executes the sliding instruction to display an action of the list corresponding to the sliding signal on the first interface according to the sliding signal.

Alternatively, the second touch is a first click action applied to a blank area on the first interface displayed on the touch screen display. After the device 20 enters into the hold state, the processor 21 may execute the detecting instruction to detect the first click action applied to the blank area on the first interface so as to generate a first click signal. When the first click signal is detected, the processor 21 executes the instruction of cancelling the hold state, so as to make the device 20 cancel the hold state according to the first click signal. For example, the processor 21 releases the item information of the first item from the second interface, and cancels the second interface from the touch screen display.

Alternatively, the second touch is a second click action applied to a second area of any one of the plurality of items. After the device 20 enters into the hold state, the processor 21 may execute the detecting instruction to detect the second click action applied to the second area of the any one of the plurality of items, so as to generate a second click signal. When the second click signal is detected, the processor 21 may execute the instruction of entering into an interface of detailed information, and make the device 20 cancel the hold state and enter into the interface of detailed information of the selected item, according to the second click signal.

Alternatively, the second touch is a touch point dragging action which includes: a touch point is dragged from the second interface to a second item of the plurality of items is located, or from the second item is located to the second interface.

After the device 20 enters into the hold state, the processor 21 may execute a detecting instruction to detect a touch point dragging action so as to generate a touch point dragging signal. When the touch point dragging signal is detected, the processor 21 executes the instruction of merging item information according to the touch point dragging signal, which may include: merging the item information of the second item and the item information of the first item; setting the first item to be invisible so as to link it to the second item; and updating the list.

Alternatively, after the device 20 enters into the hold state, the processor 21 may execute the detecting instruction to detect the touch point dragging action so as to generate the touch point dragging signal, that is, to detect that the touch point performed on the touch screen display is dragged from the second interface to a second item of the plurality of items is located, or is dragged from the second item is located to second interface. When the touch point dragging signal is detected, the processor 21 executes the instruction of merging item information according to the touch point dragging signal, which may include: generating a list which includes the first item and the second item.

Alternatively, before the processor 21 executes the instruction of merging item information, the processor 21 executes an instruction of prompting, to prompt the user whether or not to perform the merge operation. If it is detected that the user's selection is not to perform the merge operation, the processor 21 makes the device 20 return to the previous hold state.

Alternatively, the second touch may be a third click action applied to the second interface displayed on the touch screen display. After the device 20 enters into the hold state, the processor 21 may execute the detecting instruction to detect the third click action so as to generate a third click signal. When the third click signal is generated upon the third click action is detected, the processor 21 executes the returning instruction to display the first item on the first interface Although the present disclosure has been described in detail with reference to the above exemplary embodiments, the scope of the present disclosure is not limited thereto. Various modifications and variations may be done to the present disclosure without departing from the scope and idea of the present disclosure by those skilled in the art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device for managing information, comprising:
   a touch screen display;
   a memory configured to store computer-executable instructions; and
   a processor configured to execute the computer-executable instructions to cause the device to execute:
   displaying a list comprising a plurality of items on a first interface on the touch screen display;
   detecting a first touch applied to a first area of a first item of the plurality of items displayed on the touch screen display;
   entering into an item-information-hold state based on the first touch, in the item-information-hold state, an item information of the first item corresponding to the first touch is displayed in a second interface overlapping on the first interface, wherein the item information displayed in the second interface is at a predefined position different from an original position of the first item in the first interface;
   detecting a second touch applied to the touch screen display during a period of the item-information-hold state; and
   operating the first interface based on the second touch while the item information of the first item corresponding to the first touch remains displayed in the second interface overlapping on the first interface.

2. The device according to claim 1, wherein the second touch is a sliding action applied to the first interface which is interpreted as a sliding operation on the first interface, the sliding operation comprises:
   detecting the sliding action so as to generate a sliding signal corresponding to the first interface; and
   sliding the list displayed on the first interface based on the sliding signal.

3. The device according to claim 1, wherein the second touch is a first click action applied to a blank area on the first interface displayed on the touch screen display which is interpreted as an operation of cancelling the item-information-hold state on the first interface, and
   the operation of cancelling the item-information-hold state comprises:
      detecting the first click action so as to generate a first click signal;
      cancelling the item-information-hold state based on the first click signal, which comprises:
         cancelling the second interface.

4. The device according to claim 1, wherein the second touch is a second click action applied to a second area of any one of the plurality of items which is interpreted as an operation of entering into an interface of detailed information for the first interface,
   the operation of entering into an interface of detailed information comprises:
      detecting the second click action so as to generate a second click signal;
      cancelling the item-information-hold state based on the second click signal, which comprises:
         cancelling the second interface; and
         entering into an interface of detailed information of any one of the plurality of items.

5. The device according to claim 1, wherein the second touch is a touch point dragging action which is interpreted as an operation of merging item information on the first interface, the touch point dragging action comprises: a touch point performed on the touch screen display is dragged from the second interface to a second item of the plurality of items is located, or is dragged from the second item is located to the second interface, and
   the operation of merging item information comprises:
      detecting the touch point dragging action so as to generate a touch point touch point dragging signal;
      performing the operation of merging item information based on the touch point dragging signal, which comprises:
         merging the item information of the second item and the item information of the first item;
         setting the first item to be invisible so as to and link it to the second item; and
         updating the list.

6. The device according to claim 1, wherein the second touch is a touch point dragging action which is interpreted as an operation of merging item information on the first interface, the touch point dragging action comprises: a touch point performed on the touch screen display is dragged from the second interface to a second item of the plurality of items is located, or is dragged from the second item is located to the second interface, and
   the operation of merging item information comprises:
      detecting the touch point dragging action, so as to generate a touch point dragging signal;
      performing the operation of merging item information based on the touch point dragging signal, which comprises:
         generating a list comprising the first item and the second item.

7. The device according to claim 5, wherein the operation of merging item information further comprises:
   prompting a user whether or not to perform the operation of merging item information; and
   returning to the item-information-hold state when it is determined not to perform the operation of merging item information based on an input from the user.

8. The device according to claim 6, wherein the operation of merging item information further comprises:
   prompting a user whether or not to perform the operation of merging item information; and
   returning to the item-information-hold state when it is determined not to perform the operation of merging item information based on an input from the user.

9. The device according to claim 1, wherein the second touch is a third click action applied to the second interface displayed on the touch screen display which is interpreted as an operation of returning to a previously selected item on the first interface, and
   the operation of returning to an item comprises:
      detecting the third click action so as to generate a third click signal;
      displaying the first item on the first interface based on the third click signal.

10. A method for managing information displayed on a touch screen display, comprising:
    (a) displaying a list comprising a plurality of items on a first interface on the touch screen display;
    (b) detecting a first touch applied to a first area of a first item of the plurality of items displayed on the touch screen display;
    (c) entering into an item-information-hold state based on the first touch;
    (d) detecting a second touch applied to the touch screen display during a period of the item-information-hold state; and
    (e) operating the first interface based on the second touch while an item information of the first item corresponding to the first touch remains displayed in a second interface overlapping on the first interface, wherein the item information displayed in the second interface is at a predefined position different from an original position of the first item in the first interface.

11. The method according to claim 10, wherein the second touch is a sliding action applied to the first interface,
    the step (e) comprises:
       detecting the sliding action so as to generate a sliding signal corresponding to the first interface;
       displaying an action of the list, which is corresponding to the sliding signal, on the first interface based on the sliding signal.

12. The method according to claim 10, wherein the second touch is a first click action applied to a blank area on the first interface displayed on the touch screen display which is interpreted as an operation of cancelling the item-information-hold state on the first interface,
    the step (e) comprises:
       detecting the first click action so as to generate a first click signal;
       cancelling the item-information-hold state based on the first click signal, which comprises:
          cancelling the second interface.

13. The method according to claim 10, wherein the second touch is a second click action applied to a second area of any one of the plurality of items which is interpreted as an operation of entering into an interface of detailed information on the first interface, the step (e) comprises:
detecting the second click action so as to generate a second click signal;
cancelling the item-information-hold state based on the second click signal, which comprises:
cancelling the second interface; and
entering into an interface of detailed information of any one of the plurality of items.

14. The method according to claim 10, wherein the second touch is a touch point dragging action which is interpreted as an operation of merging item information for the first interface, the touch point dragging action includes: a touch point performed on the touch screen display is dragged form the second interface to a second item of the plurality of items is located, or is dragged from the second item is located to the second interface, the step (e) comprises:
detecting the touch point dragging action, so as to generate a touch point dragging signal;
performing the operation of merging item information based on the touch point dragging signal, which comprises:
merging the item information of the second item and the item information of the first item;
setting the first item to be invisible so as to link it to the second item; and
updating the list.

15. The method according to claim 10, wherein the second touch is a touch point dragging action which is interpreted as an operation of merging item information for the first interface, the touch point dragging action includes: a touch point performed on the touch screen display is dragged from the second interface to a second item of the plurality of items is located, or is dragged from the second item is located to the second interface, the step (e) comprises:
detecting a touch point dragging action, so as to generate a touch point dragging signal;
performing the operation of merging item information based on the touch point dragging signal, which comprises:
generating a list comprising the first item and the second item.

16. The method according to claim 14, the step (e) further comprises:
prompting a user whether or not to perform the operation of merging item information;
returning to the item-information-hold state when it is determined not to perform the operation of merging item information based on an input from the user.

17. The method according to claim 15, wherein the step (e) further comprises:
prompting a user whether or not to perform the operation of merging item information;
returning to the item-information-hold state when it is determined not to perform the operation of merging item information based on an input from the user.

18. The method according to claim 10, wherein the second touch is a third click action applied to the second interface displayed on the touch screen display which is interpreted as an operation of returning to a previously selected item for the first interface, the step (e) comprises:
detecting the third click action so as to generate a third click signal;
displaying a first item on the first interface based on the third click signal.

* * * * *